(12) United States Patent
Houssaye

(10) Patent No.: US 10,029,799 B2
(45) Date of Patent: Jul. 24, 2018

(54) AIR CONDITIONING METHOD AND SYSTEM FOR AIRCRAFT

(71) Applicant: TURBOMECA, Bordes (FR)

(72) Inventor: Laurent Houssaye, Saint Faust (FR)

(73) Assignee: TURBOMECA, Bordes (FR)

( * ) Notice: Subject to any disclaimer, the term of this patent is extended or adjusted under 35 U.S.C. 154(b) by 0 days.

(21) Appl. No.: 14/442,390

(22) PCT Filed: Nov. 7, 2013

(86) PCT No.: PCT/FR2013/052661
§ 371 (c)(1),
(2) Date: May 12, 2015

(87) PCT Pub. No.: WO2014/076391
PCT Pub. Date: May 22, 2014

(65) Prior Publication Data
US 2016/0272331 A1    Sep. 22, 2016

(30) Foreign Application Priority Data

Nov. 19, 2013 (FR) ..................... 12 60988

(51) Int. Cl.
*F24F 5/00* (2006.01)
*F24F 3/14* (2006.01)
(Continued)

(52) U.S. Cl.
CPC .......... *B64D 13/08* (2013.01); *B64D 13/02* (2013.01); *B64D 13/06* (2013.01); *F25B 9/06* (2013.01);
(Continued)

(58) Field of Classification Search
CPC ............... B64D 13/06; B64D 13/08; B64D 2013/0662; F24F 2005/0039; F24F 5/0007; F24F 5/0035; F24F 3/14; F24F 3/1405; F24F 2003/1446; B01D 53/265; B01D 8/00; F25D 23/00; F25D 9/00; F28C 3/02; F64D 13/00; F64D 13/02; F64D 13/06;
(Continued)

(56) References Cited

U.S. PATENT DOCUMENTS 3,750,693 A * 8/1973 Hardison ............ F16K 1/12
137/219
4,207,754 A * 6/1980 Chaboseau ......... F24F 5/0085
62/402

(Continued)

FOREIGN PATENT DOCUMENTS

EP   1 388 492 A1   2/2004
EP   2 165 931 A2   3/2010

*Primary Examiner* — Frantz Jules
*Assistant Examiner* — Erik Mendoza-Wilkenfe
(74) *Attorney, Agent, or Firm* — Womble Bond Dickinson (US) LLP

(57) ABSTRACT

Air conditioning system for the pressurized cabin of an aircraft, said system (1) being characterized in that it comprises an air withdrawal module (3) configured for withdrawing ambient air from outside the aircraft, an air compression module (5) configured for compressing the withdrawn air flow (F1) and an air cooling module (10) comprising means (15) for storing at least one coolant configured for cooling the compressed air flow (F2, F3).

7 Claims, 3 Drawing Sheets

(51) Int. Cl.
  *F25D 23/00* (2006.01)
  *F25B 9/00* (2006.01)
  *F28C 3/02* (2006.01)
  *B64D 13/00* (2006.01)
  *B64D 13/02* (2006.01)
  *B64D 13/06* (2006.01)
  *B64D 13/08* (2006.01)
  *B01D 8/00* (2006.01)
  *B64C 13/02* (2006.01)
  *F25B 9/06* (2006.01)

(52) U.S. Cl.
  CPC .............. *B64D 2013/0618* (2013.01); *B64D 2013/0644* (2013.01); *B64D 2013/0648* (2013.01); *B64D 2013/0674* (2013.01); *B64D 2013/0688* (2013.01); *Y02T 50/56* (2013.01)

(58) Field of Classification Search
  CPC . F64D 13/08; F60H 1/036; F60H 1/18; F60H 1/32; B64C 13/02
  See application file for complete search history.

(56) References Cited

U.S. PATENT DOCUMENTS

| 5,960,635 | A | * | 10/1999 | Dakhil | F17C 7/04 |
| | | | | | 62/48.1 |
| 2002/0166923 | A1 | | 11/2002 | Munoz et al. | |
| 2008/0032616 | A1 | * | 2/2008 | Vogel | B64D 13/06 |
| | | | | | 454/74 |
| 2012/0240599 | A1 | * | 9/2012 | Stolte | B64D 13/08 |
| | | | | | 62/45.1 |
| 2013/0086927 | A1 | * | 4/2013 | Mills | F25B 27/00 |
| | | | | | 62/56 |

* cited by examiner

AIR CONDITIONING METHOD AND SYSTEM FOR AIRCRAFT

FIELD OF THE INVENTION

The invention relates to the field of air conditioning in aircraft, and more particularly to air conditioning intended for supplying the pressurised cabin of an aircraft. The invention relates more particularly to an air conditioning system and method for an aircraft, and to an aircraft comprising a system of this kind.

PRIOR ART

At the cruising altitude of an aircraft, for example at an altitude of 10,000 meters, the pressure of the ambient outside air is generally from approximately 0.2 to 0.3 bar, and the temperature thereof is between −20 and −60° C., whereas the pressure in the pressurised cabin of the aircraft is approximately 0.8 bar and the temperature at the inlet of the cabin air conditioning module is approximately −15° C.

In order to supply the pressurised cabin with air, it is known to withdraw air in the region of the main engines in order to condition said air and to then route it to a cabin air conditioning module.

A compressed air flow, which is pressurised and at a high temperature, is thus withdrawn from the compressor stages of the main engines and is then cooled by a pre-cooler, at the outlet of which the pressure of said air is approximately 2 bar and the temperature thereof is approximately 200° C. Said air is then cooled again and at the same time dehumidified and expanded in a cooling module, at the outlet of which the pressure of said air is close to that of the cabin, at approximately 0.8 bar, and the temperature of said air is approximately −15° C. The air thus conditioned is then routed to the cabin air conditioning module of the aircraft in order to ensure the thermal regulation thereof and the supply of fresh air. A system of this kind, however, has numerous disadvantages.

Firstly, since the pressure of the withdrawn air is high, the air must be expanded so as to reach the required pressure level at the inlet of the cabin air conditioning module of the aircraft. Such an expansion requires the use of a cooling module comprising a turbocharger and a plurality of heat exchangers which consume energy and which make the structure of the system more complex, which is a first disadvantage.

Moreover, the pre-cooler of a system of this kind requires additional air to be withdrawn, at a low temperature, in order to cool the hot air withdrawn at the compressor stages of the main engines of the aircraft. Multiple air withdrawals of this kind from different regions of the aircraft makes the air conditioning system, and thus the internal structure of the aircraft, more complex, which increases the drag and the fuel consumption, and is a second disadvantage.

Furthermore, a system of this kind makes the installation and operability of the main engines complex and may reduce the performance thereof, which is a third disadvantage.

Moreover, withdrawing air at the compressor stages of the main engines accordingly reduces the amount of air which can be used for the propulsion of the aircraft, which increases the fuel consumption and is thus a fourth disadvantage.

Finally, the variability of the engine speed necessitates a complex system in order to ensure an invariable minimum level of air withdrawal, which is a fifth disadvantage.

SUMMARY OF THE INVENTION

The invention aims to improve the existing air conditioning systems for aircraft so as to economise the energy of the aircraft and to simplify the air conditioning and, more generally, the structure of the aircraft.

The object of the invention is therefore to provide an air conditioning system for a pressurised cabin of an aircraft, which is distinctive in that it comprises an air withdrawal module configured for withdrawing ambient air from outside the aircraft, an air compression module configured for compressing the withdrawn air flow, and an air cooling module comprising means for storing at least one coolant and configured for cooling the compressed air flow by means of said coolant.

The term "ambient outside air" means the open air outside the aircraft, as opposed to the air flowing in the aircraft engines.

The air thus cooled can then be routed to an air conditioning module of the cabin of the aircraft, which then adjusts the temperature of the air flow depending on the cabin settings in order to supply said cabin with cool air.

The compression module makes it possible to compress the ambient air withdrawn from outside the aircraft, the pressure and the temperature of which are generally lower than the levels of pressure and temperature required at the inlet of the cabin air conditioning module. A compression of this kind makes it possible to increase the pressure of the air to the pressure level required in the cabin, for example 0.8 bar. Since the pressure of the withdrawn ambient outside air is approximately 0.2 or 0.3 bar, the compression rate associated with a compression of this kind in order to obtain a pressure close to the level required in the cabin, for example 0.8 bar, is low, for example approximately 3 or 4, and thus requires little energy. The compression can be carried out up to a value which is slightly greater than the pressure required in the cabin, for example 0.9 bar, in order to allow for the drop in the air pressure associated with head losses between the air compression module and the air conditioning module of the aircraft.

When the compression increases the temperature of the withdrawn air to above the level required at the inlet of the cabin air conditioning module, the cooling module then receives and cools the compressed air flow to the temperature level required at the inlet of the cabin air conditioning module, for example −15° C. The cooled air is then provided to the air conditioning module of the aircraft in order to ensure the thermal regulation of and the supply of cool air to the pressurised cabin of the aircraft.

The system according to the invention only withdraws ambient outside air. It is therefore no longer necessary to withdraw air at the compressor stages of the main engines, which makes it possible to improve the effectiveness thereof and to make the air conditioning system independent of the variations in the engine speed of the aircraft. In particular, and in contrast with the existing solutions, the air withdrawal module of the system according to the invention can thus comprise a single means for withdrawing air which can be formed, for example, by a dynamic air inlet or by a controllable valve.

Moreover, it is no longer necessary to increase the number of air withdrawals at different temperatures and in different regions of the aircraft, which simplifies the architecture thereof and makes it possible to reduce the drag and thus the fuel consumption thereof.

The structure of a system of this kind is simple and makes it possible in particular to avoid using a turbocharger and a plurality of heat exchangers for cooling the air. Moreover, the installation, operability and maintenance of the engines is made easier.

The means for storing coolant are can thus be easily refilled, for example while maintaining an aircraft. A cold accumulator of this kind makes it possible to reduce the temperature of a first air flow without needing to withdraw a second flow of ambient outside air. In addition, the air is compressed up to the value required in the cabin, or slightly above said value in order to compensate for the head losses in the system, significantly limiting the energy required for said compression. The cooling is thus achieved without expanding the air, which simplifies the structure of the system by avoiding using an expansion module.

The cooling module is preferably self-contained. "Self-contained" means that the air is cooled purely by means of the coolant stored in the storage means, i.e. without using fluid from another source.

According to a feature of the invention, the means for storing coolant are configured for storing a fluid at a low temperature, for example less than −180° C., allowing the compressed air flow to be cooled.

The coolant is advantageously a cryogenic fluid, preferably a cryogenic liquid.

The means for storing coolant are advantageously in the form of a cryogenic fluid tank. A cryogenic fluid of this kind may, for example, be liquid nitrogen, liquid air, liquid helium, etc.

The cooling module is advantageously configured for delivering a gaseous fluid, for example pressurised nitrogen gas, the temperature of which is preferably lower than that of the compressed air flow, which is capable of supplying a turbine and thus of providing mechanical energy.

According to an aspect of the invention, the system comprises a thermal exchange module, for example a heat exchanger, arranged between the air compression module and the cooling module, configured for cooling the compressed air flow received from the air compression module by means of the flow of gaseous fluid delivered by the cooling module, and for routing, on the one hand, the compressed air flow thus cooled to the cooling module and, on the other hand, the flow of gaseous fluid to a heating module. A loop of this kind makes it possible to use the caloric energy of the gaseous fluid delivered by the cooling module in order to pre-cool the compressed air flow by means of the heat exchanger.

According to an aspect of the invention, the system comprises an air flow orientation module arranged between the compression module and the cooling module and configured for orienting the air flow, compressed by the air compression module, towards the air cooling module when the temperature of the compressed air is greater than the temperature required at the inlet of the cabin air conditioning module, or towards a heating module when the temperature of the compressed air is lower than the temperature required at the inlet of the cabin air conditioning module.

The air flow orientation module is preferably in the form of a two-way valve.

Still preferably, the system comprises a heating module configured for receiving a flow of gaseous fluid to be heated, for example coming from the thermal exchange module, or an air flow coming from the air flow orientation module.

According to a feature of the invention, the heating module is configured for routing the heated air towards the cabin air conditioning module or towards a turbine.

The system advantageously comprises a turbine configured for receiving, from the heating module, the flow of gaseous fluid, and for supplying, for example, a generator for providing electrical current, for example, for supplying the apparatus of the aircraft. The flow exiting from a turbine of this kind can also make it possible to cool the engine bay(s) of the aircraft (an engine bay being the chamber in which the engine in installed), and/or to make the atmosphere inert, thus greatly reducing the risk of fire. Recovering the gaseous fluid delivered by the cooling module thus makes it possible to produce additional energy at low cost.

The compression module is preferably a load compressor, for example an auxiliary power unit (APU).

According to an aspect of the invention, the cooling module comprises a condenser configured for condensing water from the air flow, a water extractor configured for extracting said water, a cooler configured for cooling the dry air flow, and a tank for a coolant, for example a cryogenic liquid such as liquid nitrogen, liquid air, liquid helium, etc., configured for permitting the condensation of the water from the flow by the condenser and the cooling of the dried flow by the cooler, for example to negative temperatures, without the risk of clogging by ice.

The cooling module is advantageously configured for dehumidifying the received compressed air flow.

According to a feature of the invention, the heating module is thermal recuperator, for example a heat exchanger.

The invention also relates to an aircraft comprising an air conditioning system as defined above.

The invention also relates to an air conditioning method in an aircraft as defined above, comprising a pressurised cabin and an air conditioning module for said cabin, said method being distinctive in that it comprises:

a step of withdrawing ambient air from outside the aircraft, a step of compressing the withdrawn air flow, a step of cooling the compressed air flow by means of a cryogenic fluid, a step of routing the air flow thus cooled towards the cabin air conditioning module of the aircraft.

The method preferably comprises, between the compression and cooling steps, a step of orienting the air flow, compressed by the air compression module, towards the air cooling module when the temperature of the compressed air is greater than the temperature required at the inlet of the cabin air conditioning module, or towards a heating module when the temperature of the compressed air is lower than the temperature required at the inlet of the cabin air conditioning module.

According to an aspect of the invention, the method further comprises a step of sending, via the heating module, a flow of gaseous coolant towards a recovery turbine.

Further features and advantages of the invention will become apparent in the following description, made with reference to the accompanying figures which are given by way of non-limiting example and in which similar objects are provided with identical reference signs:

DETAILED DESCRIPTION

In an aircraft, the air conditioning system makes it possible to supply the pressurised cabin with air from the outside.

Description of the System According to the Invention

Figure 1:
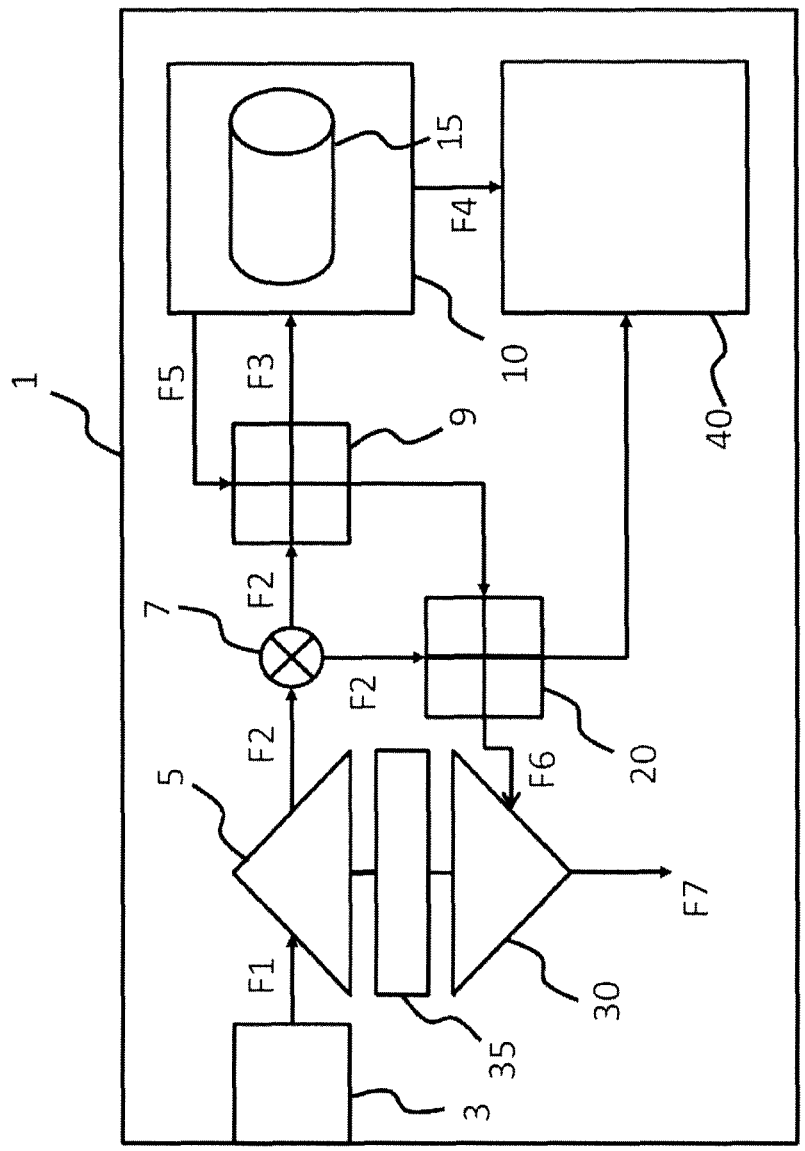
FIG. 1 is a diagram of the air conditioning system according to the invention.

The embodiment of the air conditioning system 1 according to the invention shown in FIG. 1 comprises an air withdrawal module 3, an air compression module 5, an air orientation module 7, a thermal exchange module 9, a cooling module 10, a thermal recovery module 20, a turbine 30, and an air conditioning module 40 of the pressurised cabin of the aircraft.

Air Withdrawal Module 3

The air withdrawal module is configured for withdrawing ambient air from outside the aircraft. The air withdrawal module 3 comprises one or more ambient outside air inlets, preferably a single air inlet, for example of the dynamic air inlet type. An air inlet is said to be dynamic (as opposed to a static air inlet) when it is capable of transforming kinetic energy from the captured air into pressure (shut-off pressure or dynamic pressure). A dynamic air inlet of this kind may be that of an auxiliary power unit (APU) of the aircraft. In an alternative embodiment, the air withdrawal module may be formed of one or more controllable air withdrawal valves.

Air Compression Module 5

The air compression module 5 comprises at least one compressor, which may for example be the load compressor of an auxiliary power unit of the aircraft. A unit of this kind usually comprises a load compressor 5 and a turbine engine comprising a motor or a generator 35 and a turbine 30. The load compressor 5 is configured for receiving the air flow F1 withdrawn by the withdrawal module 3, compressing said air flow and routing the compressed air flow F2 to the air orientation module 7.

Air Orientation Module 7

The air orientation module 7, for example a two-way valve, is configured for orienting the compressed air flow F2 towards the thermal exchange module 9 or towards the thermal recovery module 20. The air orientation module 7 comprises means for measuring the temperature of the compressed air flow F2 coming from the air compression module 5 and means for comparing the measured value with a reference value corresponding to a level required at the inlet of the cabin air conditioning module 40. The air orientation module 7 is thus configured for orienting the compressed air flow F2 towards the thermal exchange module 9 in order to then cool said air flow when the measured temperature of the compressed air is greater than that of the level required at the inlet of the air conditioning module 40. The air orientation module 7 is also configured for orienting the compressed air flow towards the thermal recovery module 20 in order to reheat said air flow when the measured temperature of the compressed air is lower than that of the level required at the inlet of the air conditioning module 40.

Thermal Exchange Module 9

The thermal exchange module 9 comprises at least one heat exchanger configured for permitting heat exchange between the compressed air flow F2 received from the air orientation module 7 and a flow of gaseous fluid F5 coming from the cooling module 10.

Cooling Module 10

Figure 2:
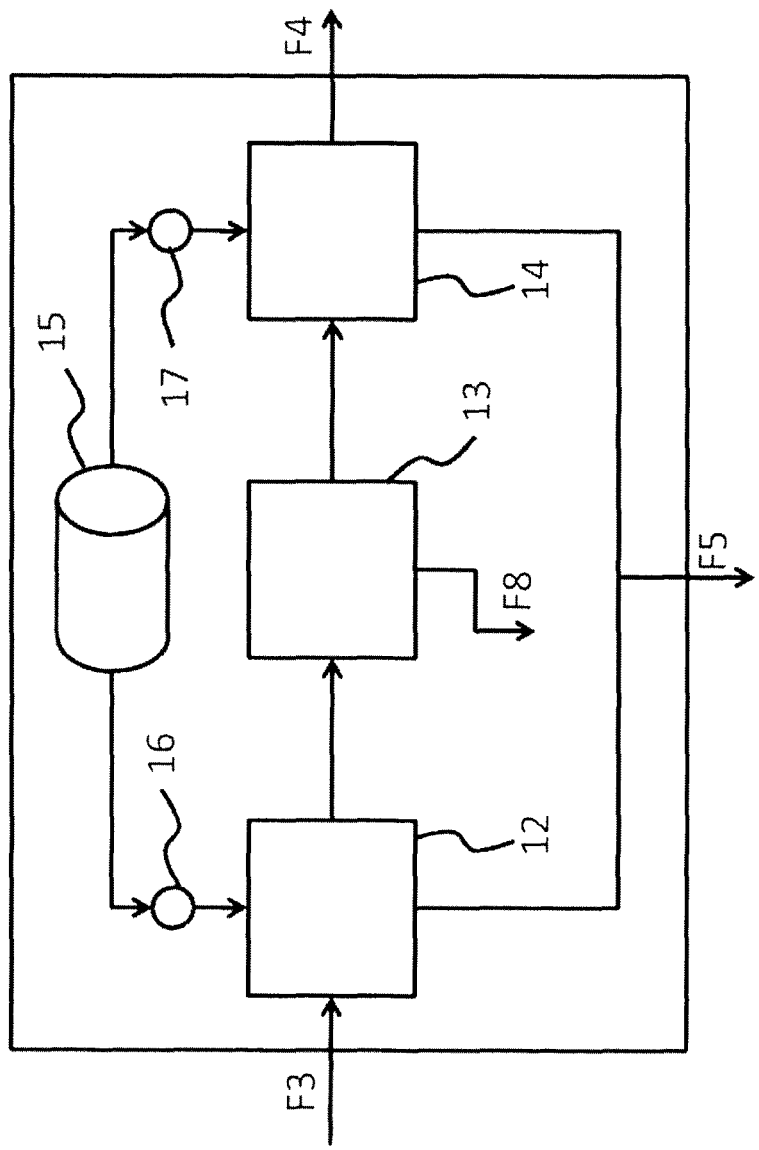
FIG. 2 is a diagram of the cooling module of the system from FIG. 1.
Figure 3:
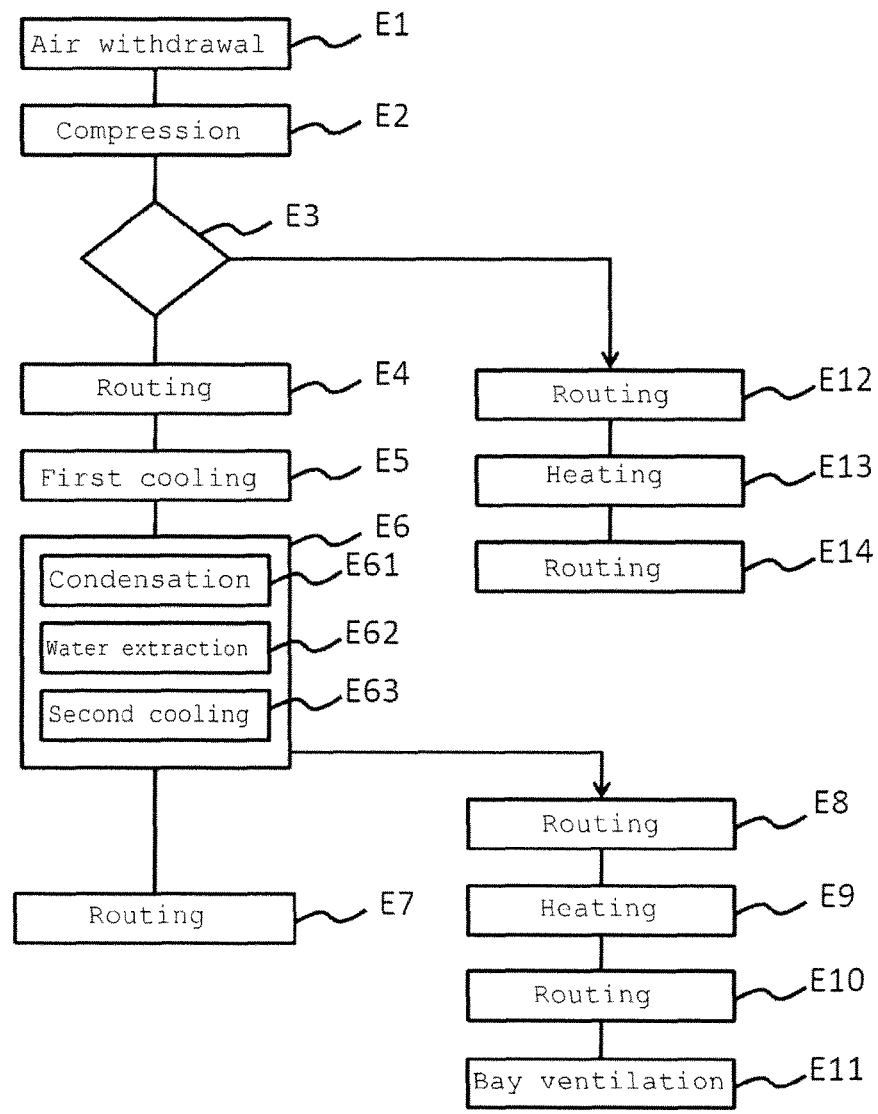
FIG. 3 shows the air conditioning method according to the invention.

The cooling module 10 is configured for receiving the air flow F3 coming from the air orientation module 7 and having passed through the thermal exchange module 9, and for cooling said received flow F3. As shown in FIG. 2, the cooling module comprises a condenser 12, a water extractor 13, a cooler 14, a tank of cryogenic fluid 15, for example liquid nitrogen pressurised to 10 bar, a first regulation valve 16 arranged between the cryogenic fluid tank 15 and the condenser 12, and a second regulation valve 17 arranged between the cryogenic fluid tank 15 and the cooler 14. The condenser 12 is configured for receiving an air flow to be cooled, for example a compressed air flow which is possibly humid, at a temperature of up to 100° C. at cabin pressure, for example approximately 0.8 bar. The condenser 12 is also configured for condensing the water vapour contained in the received compressed air flow while avoiding the icing thereof by maintaining a positive temperature at the outlet. The water extractor 13 is configured for extracting water from the air flow, condensed by the condenser 12, the water flow F8 of which may then be, for example, eliminated or injected into a water system of the aircraft. The cooler 14 is configured for cooling the dry air flow received from the water extractor 13 by means of cryogenic fluid received from the tank 15 via the second regulation valve 17, and for routing the obtained cold, dry air flow F4 towards the cabin air conditioning module 40. The liquid cryogenic fluid stored in the tank is thus used by both the condenser 12 and the cooler 14. The coolant, passed in gaseous form following the heat exchanges carried out in the condenser 12 and the cooler 14, is recycled by being routed towards the thermal exchange module 9 in order to cool the compressed air flow F2 passing through the thermal exchange module 9 and coming from the air orientation module 7.

Heating Module 20

The heating module 20 may be in the form of a thermal recuperator, arranged for example in the exhaust of the auxiliary power unit (APU). The heating module 20 is configured for, in a first mode of functioning, heating the air flow F2 received from the air orientation module 7 and then routing said air flow towards the cabin air conditioning module 40 and for, in a second mode of functioning, heating the flow of gaseous coolant F5 received from the thermal exchange module 9 and sending said flow towards the turbine 30. A route by-passing said heating module may be provided for regulating the thermal energy for heating the air flow F2.

Turbine 30

The turbine 30 is configured for receiving a flow of gaseous fluid from the heating module 20. The mechanical energy produced by the turbine 30 from the received flow of gaseous fluid may, for example, be injected into the gearbox of the auxiliary power unit (APU) or used for driving an alternator, or for any other use which may be more appropriate. The exiting gaseous flow F7 may again be used for cooling the engine bay of the aircraft and/or for making the atmosphere inert if said fluid is nitrogen gas for example.

Air Conditioning Module of the Pressurised Cabin of the Aircraft

The air conditioning module 40 comprises a mixer (not shown) configured for receiving the cooled air flow F4 from the cooling module 10 and for mixing said air flow with air from the cabin in order to provide the cabin with an air flow at the desired control temperature.

The system according to the invention may also comprise means for regulating the pressure of the cabin (not shown) and control means configured for controlling one or all of the modules of the system (air withdrawal module, air compression module, air orientation module, cooling module, air conditioning heating turbine, etc.).

Use of the System According to the Invention

In a first step E1, the air withdrawal module 3 withdraws ambient outside air and routes the flow of withdrawn ambient air F1 towards the air compression module 5.

In a step E2, the air compression module 5 compresses the withdrawn air F1 and sends the compressed air flow F2 towards the air orientation module F7.

In a step E3, the air orientation module 7 determines whether the temperature of the compressed air flow F2 is greater or lower than a reference value associated with the level required at the inlet of the air conditioning module 40.

When the temperature of the compressed air flow is greater than the reference value, the air orientation module 7 routes, in a step E4, the compressed air flow F2 to be cooled towards the thermal exchange module 9. The compressed air flow F2 then passes through the thermal exchange module 9, in which it undergoes a first cooling, during a step E5, by a gaseous fluid F5 coming from the cooling module 10. The compressed air flow F3 is then routed to the cooling module 10, in which it undergoes a second cooling during a step E6.

More specifically, the compressed air flow F3 passes through the condenser 12 in a step E61, during which the water vapour which may be present in the air flow is condensed. The condenser 12 uses the cryogenic fluid received, via the first valve 16, from the cryogenic fluid tank 15 in order to reduce the temperature of the air flow to a temperature which is just positive, for example 2° C., in order to allow condensation of the water vapour without icing. The gaseous fluid F5 produced by the heat exchange between the air flow and the cryogenic fluid is then routed towards the thermal exchange module 9.

The water is then extracted from the air flow, in a step E62, by the water extractor 13, and then the air flow is routed to the cooler 14 which then uses, in a step E63, the cryogenic fluid received via the second valve 17, in order to reduce the temperature of the dry air flow to the level of the temperature required at the inlet of the air conditioning module 40, for example −15° C. The gaseous fluid produced by the heat exchange between the air flow and the cryogenic fluid is also routed towards the thermal exchange module 9.

The cold, dry air flow F4 is then routed, in a step E7, to the cabin air conditioning module 40. The temperature desired in the cabin can then be obtained by means of the mixer of the air conditioning module 40. Moreover, the means for regulating the cabin pressure make it possible to keep the cabin pressurised, for example at 0.8 bar.

The gaseous fluid F5 emitted by the heat exchanges in the condenser 12 and in the cooler 14 is routed via a feedback loop, during a step E8, to the thermal exchange module 9 where it is used for carrying out a first cooling of the compressed air flow F2 coming from the air orientation module 7.

Once the heat exchange has been carried out in the thermal exchange module 9, the flow of gaseous fluid is routed to the heating module 20, which increases the temperature thereof, in a step E9, prior to sending said fluid towards the turbine 30 of the APU in a step E10. The turbine 30 can then use the flow of gaseous fluid F6 in order to, for example, supply a generator and produce electricity.

When the temperature of the flow of gaseous fluid F7 is lower than a reference value, for example one-thirtieth of a degree Celsius, the flow can be used to cool the engine bay of the aircraft and/or to make the atmosphere inert, in s step E11.

When the temperature of the compressed air flow F2 is lower than the reference value, the air orientation module 7 routes, in a step E12, the compressed air flow F2 to be heated towards the heating module 20.

The heating module 20 then increases the temperature of the air flow during a step E13 and then routes said air flow towards the cabin air conditioning module 40 during a step E14. The temperature desired in the cabin can then be obtained using the mixer of the air conditioning unit 40.

It will be appreciated that, in a simplified embodiment of the system according to the invention, the thermal exchange module 9 may be omitted, and the compressed air flow F2 may then be routed directly from the air orientation module 7 to the cooling module 10.

The system according to the invention thus makes it possible to compress an air flow withdrawn from the ambient air outside the aircraft to a value close to that of the pressure required in the cabin, for example at a compression rate of 3 or 4, which therefore does not require much energy. The cooling module then makes it possible to cool the flow in order to reduce the temperature thereof to the level required at the inlet of the cabin air conditioning module.

The invention claimed is:

1. Air conditioning system for a pressurised cabin of an aircraft including at least one main engine, said system comprising:
   an air withdrawal module including one or more ambient outside air inlets, said withdrawal module withdrawing air which is not withdrawn from the at least one main engine and which is configured for withdrawing one single open ambient air flow from outside the aircraft through said one or more ambient outside air inlets which is formed, either by a dynamic air inlet or by a controllable valve,
   an air compression module independent from the at least one main engine configured for compressing the single open ambient air flow withdrawn from outside the aircraft to create a single compressed air flow, and
   an air cooling module configured for cooling the single compressed air flow by means of a cryogenic fluid, the air cooling module comprising a condenser for condensing water from the single open ambient air flow, a water extractor for extracting said water, a cooler for cooling said single open ambient air flow emitted by the water extractor and a tank for cryogenic fluid, by means of which the water from the single open ambient air flow is condensed in the condenser and the single open ambient air flow emitted by the water extractor is cooled in the cooler,
   wherein the single compressed air flow being either directed to the air cooling module or to a thermal exchange module by means of an air flow orientation module, and
   wherein the cooling module is configured for delivering a gaseous fluid produced by a heat exchange between the single compressed air flow and a cryogenic fluid, the gaseous fluid being routed towards the thermal exchange module for supply to a turbine.

2. System according to claim 1, wherein the cooling module is contained within a housing.

3. System according to claim 1, in which the thermal exchange module arranged between the air compression module and the cooling module and configured for cooling the single compressed air flow received from the air compression module by means of the flow of gaseous fluid delivered by the cooling module, and for routing, on the one hand, the single compressed air flow thus cooled towards the cooling module and, on the other hand, the flow of gaseous fluid towards a heating module.

4. System according to claim 1, in which the air flow orientation module arranged between the compression module and the cooling module and configured for orienting the single open ambient air flow compressed by the air compression module towards the air cooling module when a temperature of the single compressed air flow is greater than a temperature required at the inlet of an air conditioning module of the cabin, or towards a heating module when the temperature of the single compressed air flow is lower than the temperature required at the inlet of the air conditioning module of the cabin.

5. System according to claim 1, said system comprising a heating module configured for receiving, from the thermal exchange module, a flow of gaseous fluid and for routing said flow of gaseous fluid towards a turbine, and for receiving, from the air orientation module, the single compressed air flow to be reheated and for routing said flow of gaseous fluid towards an air conditioning module of the cabin of the aircraft.

6. Aircraft comprising the air conditioning system according to claim 1.

7. System according to claim 1, wherein the air compression module is configured for compressing the single open ambient air flow at a low compression rate between 3 or 4.

* * * * *